United States Patent [19]
Huang

[11] Patent Number: 5,610,849
[45] Date of Patent: Mar. 11, 1997

[54] REAL TIME TWO-DIMENSIONAL DISCRETE COSINE TRANSFORM/INVERSE DISCRETE COSINE TRANSFORM CIRCUIT

[75] Inventor: Po-Chuan Huang, Hsinchu, Taiwan

[73] Assignee: United Microelectronics Corporation, Hsinchu, Taiwan

[21] Appl. No.: 494,598

[22] Filed: Jun. 23, 1995

[51] Int. Cl.$^6$ .................................................. G06F 15/00
[52] U.S. Cl. ................................................................ 364/725
[58] Field of Search ............................... 364/725, 726, 364/727, 754, 768; 382/43, 56

[56] References Cited

U.S. PATENT DOCUMENTS

| | | | |
|---|---|---|---|
| 4,791,598 | 12/1988 | Liou et al. | 364/725 |
| 5,249,146 | 9/1993 | Uramoto et al. | 364/725 |
| 5,257,213 | 10/1993 | Kim et al. | 364/725 |

Primary Examiner—Paul P. Gordon
Assistant Examiner—Emmanuel L. Moise
Attorney, Agent, or Firm—Cushman Darby & Cushman, IP Group of Pillsbury Madison & Sutro, LLP

[57] ABSTRACT

A 2-D DCT/IDCT circuit comprises a rate buffer, a multiplexer, a one-dimensional DCT/IDCT processor, a transpose buffer and an inverse rate buffer. The data input rate of the rate buffer and the output rate of the inverse rate buffer are a first rate, while the transform process, which is carried out between the rate buffer and the inverse rate buffer by the 1-D DCT/IDCT processor, is at a second rate. Since the second rate is approximately two times the first rate, the 2-D DCT/IDCT circuit can satisfy the requirement of high speed operation. Moreover, since the 2-D DCT/IDCT circuit according the present invention provides a specific arrangement of the order of input/output data, the hardware structure is simplified, thereby making it easy to realize in a VLSI circuit.

14 Claims, 6 Drawing Sheets

REAL TIME TWO-DIMENSIONAL DISCRETE COSINE TRANSFORM/INVERSE DISCRETE COSINE TRANSFORM CIRCUIT

BACKGROUND OF THE INVENTION

1. Field of Invention

The present invention relates to an apparatus for digital signal processing, and more specifically, to a real time two-dimensional discrete cosine transform (DCT)/inverse discrete cosine transform (IDCT) circuit suitable for implementing in a very large scale integrated (VLSI) circuit.

2. Description of Related Art

Techniques for data compression have played an important role in an image-processing system due to increasingly large amounts of video data to be processed. Among all techniques for data compression, data coding or transformation is the most difficult part. The difficulties result from, in general, the complexity of implementing the coding or transform algorithm in a circuit as well as the inefficiency of the circuit. Since the DCT/IDCT process utilizes orthogonal transform techniques which have higher transformation efficiency, it has been widely used in video systems for data coding. Therefore, in order to satisfy requirements of some international video standards, such as Joint Picture Expert Group (JPEG), Motion Photography Expert Group (MPEG) and H.261, a fast real-time 2-D DCT/IDCT circuit is a great need.

In order to have input/output data maintained in continuity, a 2-D DCT/IDCT circuit can be formed by connecting two 1-D DCT/IDCT processors in series. Or in order to attain a higher transform efficiency, a 2-D transform algorithm may be directly implemented in a circuit. The latter is not practical since the hardware design is very complicated and the circuit dimension will be too large. Therefore, almost all conventional 2-D DCT/IDCT circuits, such as that disclosed in U.S. Pat. Nos. 4,791,598 and 5,249,146, utilize the structure having two 1-D processors connected in series.

FIG. 1 (Prior Art) depicts a 2-D DCT/IDCT circuit consisting of two 1-D processors. The DCT/IDCT circuit of FIG. 1 (Prior Art) performs two successive 1-D DCT/IDCT processes to achieve a 2-D transformation. The circuit includes a 1-D DCT/IDCT processor 15, a transpose buffer 16, another 1-D DCT/IDCT processor 17 and another transpose buffer 18. Two 1-D DCT/IDCT processes of a matrix X and its transpose matrix Z are carried out in 1-D DCT/IDCT processors 15 and 17 respectively. In order to keep the output data in correct order, two transpose buffers 16 and 18 are provided to interchange column elements and row elements of the matrices. There are two similar process stages in the circuit of FIG. 1 (Prior Art). That is, the function of a first stage consisting of 1-D DCT/IDCT processor 15 and transpose buffer 16 is similar to that of a second stage consisting of 1-D DCT/IDCT processor 17 and transpose buffer 18. Therefore, a minimal circuit dimension can be obtained by establishing a feedback loop from transpose buffer 16 to 1-D DCT/IDCT processor 15 and skipping elements of the second stage, i.e., 1-D DCT/IDCT processor 17 and transpose buffer 18.

Because the above-mentioned circuit has two operating stages, the executing time will be too long to carry out a real time operation. That is, even though the circuit dimension can be reduced, the circuit shown in FIG. 1 can not satisfy the high speed requirements of video systems.

SUMMARY OF THE INVENTION

Accordingly, the present invention provides a 2-D DCT/IDCT circuit consisting of elements operated at various rates for high speed data transformation thus achieving the real time requirement.

The present invention also provides a 2-D DCT/IDCT circuit having minimal elements to decrease the circuit dimension and facilitate implementation in a VLSI circuit.

A 2-D DCT/IDCT circuit according to the present invention comprises a rate buffer, a multiplexer, a one-dimensional DCT/IDCT processor, a transpose buffer and an inverse rate buffer. In the present invention, the data input rate of the rate buffer and output rate of the inverse rate buffer are at a first rate, while the transform process, which is carried out between the rate buffer and the inverse rate buffer by the 1-D DCT/IDCT processor, is at a second rate. Since the second rate is approximately two times the first rate, the 2-D DCT/IDCT circuit can satisfy the requirements of high speed operation. Moreover, since the 2-D DCT/IDCT circuit according to the present invention provides a specific arrangement of the order of input/output data, the hardware structure is simplified so that it is easy to integrate into a VLSI circuit.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE PREFERRED EMBODIMENTS

Figure 2:
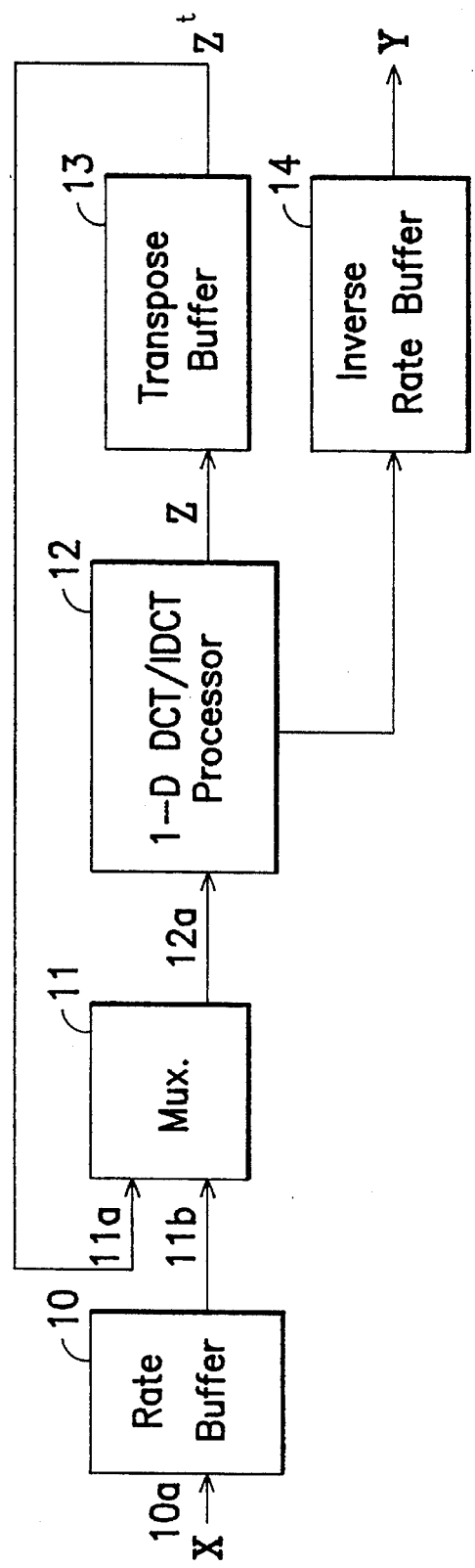
FIG. 2 is a block diagram of a 2-D DCT/IDCT circuit according to the present invention.

The 2-D DCT/IDCT circuit of a preferred embodiment of the present invention is depicted in FIG. 2. The circuit comprises a rate buffer 10, a multiplexer 11, a one-dimensional (1-D) DCT/IDCT processor 12, a transpose buffer 13 and an inverse rate buffer 14.

The circuit of the present invention has an input data matrix X and an output data matrix Y. If matrix X has a dimension of N×N, for example, N=8, the input data matrix can be represented as $$X = \begin{bmatrix} X_{00} & X_{01} & X_{02} & X_{03} & X_{04} & X_{05} & X_{06} & X_{07} \\ X_{10} & X_{11} & X_{12} & X_{13} & X_{14} & X_{15} & X_{16} & X_{17} \\ X_{20} & X_{21} & X_{22} & X_{23} & X_{24} & X_{25} & X_{26} & X_{27} \\ X_{30} & X_{31} & X_{32} & X_{33} & X_{34} & X_{35} & X_{36} & X_{37} \\ X_{40} & X_{41} & X_{42} & X_{43} & X_{44} & X_{45} & X_{46} & X_{47} \\ X_{50} & X_{51} & X_{52} & X_{53} & X_{54} & X_{55} & X_{56} & X_{57} \\ X_{60} & X_{61} & X_{62} & X_{63} & X_{64} & X_{65} & X_{66} & X_{67} \\ X_{70} & X_{71} & X_{72} & X_{73} & X_{74} & X_{75} & X_{76} & X_{77} \end{bmatrix}.$$

Thus, the output matrix also has a dimension of N×N, i.e., matrix Y can be represented as $$Y = \begin{bmatrix} Y_{00} & Y_{01} & Y_{02} & Y_{03} & Y_{04} & Y_{05} & Y_{06} & Y_{07} \\ Y_{10} & Y_{11} & Y_{12} & Y_{13} & Y_{14} & Y_{15} & Y_{16} & Y_{17} \\ Y_{20} & Y_{21} & Y_{22} & Y_{23} & Y_{24} & Y_{25} & Y_{26} & Y_{27} \\ Y_{30} & Y_{31} & Y_{32} & Y_{33} & Y_{34} & Y_{35} & Y_{36} & Y_{37} \\ Y_{40} & Y_{41} & Y_{42} & Y_{43} & Y_{44} & Y_{45} & Y_{46} & Y_{47} \\ Y_{50} & Y_{51} & Y_{52} & Y_{53} & Y_{54} & Y_{55} & Y_{56} & Y_{57} \\ Y_{60} & Y_{61} & Y_{62} & Y_{63} & Y_{64} & Y_{65} & Y_{66} & Y_{67} \\ Y_{70} & Y_{71} & Y_{72} & Y_{73} & Y_{74} & Y_{75} & Y_{76} & Y_{77} \end{bmatrix}.$$

Therefore, the input data of rate buffer 10 can be a one-dimensional sequence from input matrix X, for example, a row sequence of $X_{00}$, $X_{01}$, $X_{02}$, $X_{03}$, $X_{04}$, $X_{05}$, $X_{06}$, $X_{07}$, $X_{10}$, $X_{11}$, $X_{12}$, $X_{13}$, ..., $X_{20}$, $X_{21}$, ..., $X_{70}$, $X_{71}$, $X_{72}$, $X_{73}$, $X_{74}$, $X_{75}$, $X_{76}$ and $X_{77}$. The output data from inverse rate buffer 14 can also be a one-dimensional sequence of $Y_{00}$, $Y_{01}$, $Y_{02}$, $Y_{03}$, $Y_{04}$, $Y_{05}$, $Y_{06}$, $Y_{07}$, $Y_{10}$, $Y_{11}$, $Y_{12}$, $Y_{13}$, ..., $Y_{20}$, $Y_{21}$, ..., $Y_{70}$, $Y_{71}$, $Y_{72}$, $Y_{73}$, $Y_{74}$, $Y_{75}$, $Y_{76}$ and $Y_{77}$. All the elements of the 2-D DCT/IDCT circuit of the invention will be explained as follows.

Rate buffer 10 of the present invention provides a data input rate of a first rate and a data output rate of a second rate. That is, the aforementioned input data sequence is input to rate buffer 10 through port 10a at the first rate. Then a rearranged data sequence is output to multiplexer 11 from rate buffer 10 at the second rate. The second rate is preferably two times faster than the first rate. The various data input/output rates can be achieved by providing driving signals of different frequencies at the input end and output end of rate buffer 10. Therefore, a two-speed transform operation can be achieved inside the 2-D DCT/IDCT circuit of the present invention.

Multiplexer 14 provides two data paths for data transmission. A first data path 11b is provided for the rearranged input data sequence from rate buffer 10. This data path is active during a first time period. When a 1-D transformation of input data matrix X has been finished, a second time period begins and a second data path 11a is provided instead of the first data path by multiplexer 14 for transmitting another data sequence from transpose buffer 13.

1-D DCT/IDCT processor 12 is a 1×N two-speed processor whose latency is not greater than 2N−1. For example, if N is 8, a maximal processing time of 15 clock cycles is required. Furthermore, the throughput rate of 1-D DCT/IDCT processor 12 is approximate to the second rate. Data transmitted through the data paths of multiplexer 11 is transformed in 1-D DCT/IDCT processor 12. The structure of 1-D DCT/IDCT processor 12 has been disclosed in several articles and papers, and is known to those skilled in the art, the description is omitted here.

Transpose buffer 13 has a dimension of N×N. The data transformed by 1-D DCT/IDCT processor 12 is stored in transpose buffer 13 during the first time period. The stored data, which is denoted as matrix Z, is transposed into another data matrix Z'. Matrices Z and Z' are in 1-D format like that of the sequence from matrix X, as is stated above. Then during the second time period, matrix Z' is sent to 1-D DCT/IDCT processor 12 over second data path 11a of multiplexer 11.

As to inverse rate buffer 14, a data input rate of the second rate and a data output rate of the first rate must be consistent with rate buffer 10. During the second time period, data from 1-D DCT/IDCT processor 12 is stored in inverse rate buffer 14, and then output as data matrix Y at the first rate. The various data input/output rates can be achieved by providing driving signals of different frequencies at the input end and output end of inverse rate buffer 14.

Accompanying with the timing diagrams from FIG. 3 to FIG. 6, the operation of the 2-D DCT/IDCT circuit of the present invention will be described through an example which has the input and output data dimensions of 8×8.

Figure 3:
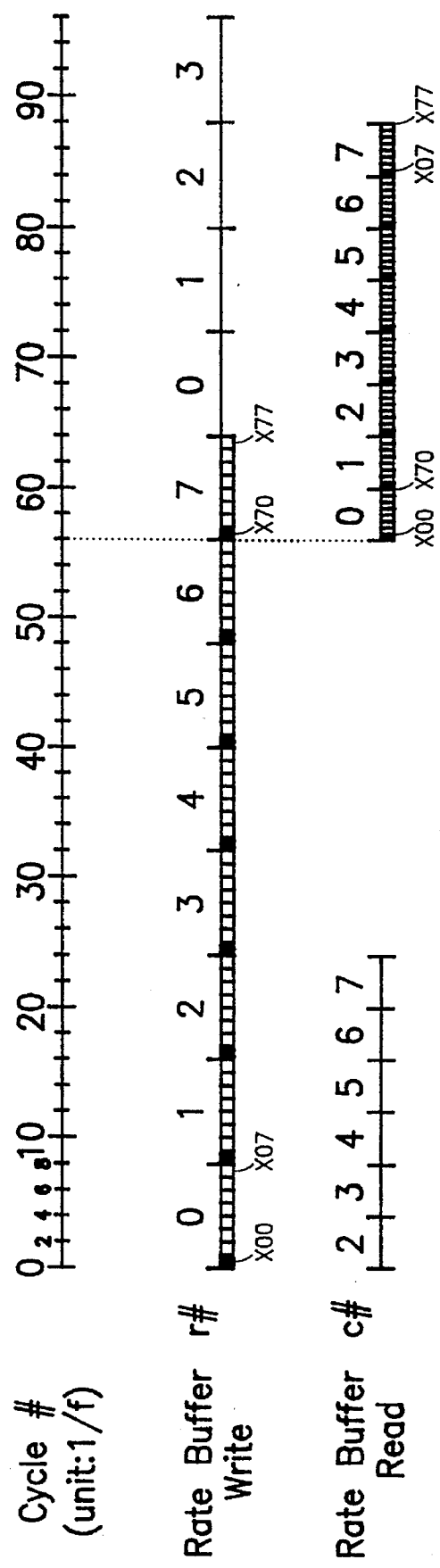
FIG. 3 is a timing diagram of input/output data of the rate buffer in FIG. 2.

Referring first to FIG. 3, timing relationships between the input data and output data of rate buffer 10 are illustrated with a reference timing coordinate whose unit time scale is 1/f. The second line in FIG. 3 depicts timing of the input data sequence from matrix X. In order to prevent data conflict, rate buffer 10 outputs data to multiplexer 11 through first data path 11b only after the first 56 elements of the input data sequence have been stored. That is, as is depicted in the second and third lines of FIG. 3, only when element $X_{70}$ of the input data sequence is about to be stored in rate buffer 10, is the first element $X_{00}$ of the sequence sent out from rate buffer 10. Obviously, data input rate f is half of the output rate in the drawing.

Figure 4:
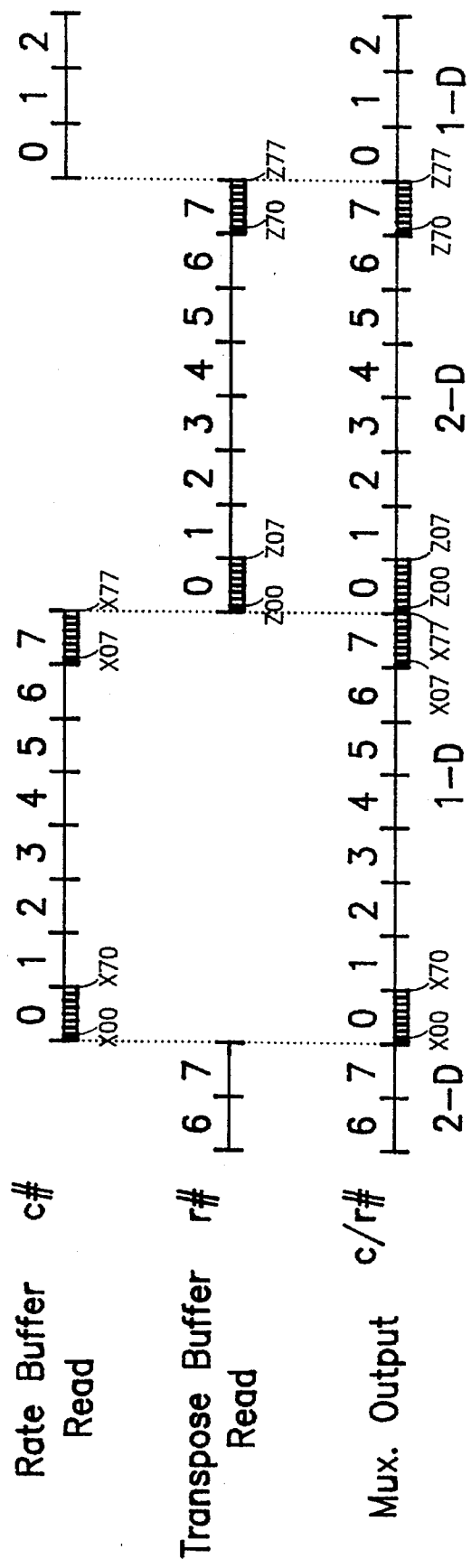
FIG. 4 is a timing diagram of input/output data of the multiplexer in FIG. 2.

Next referring to FIG. 4, the timing relationships between first data path 11b and second data path 11a of multiplexer 11 are illustrated. During the first time period, data from rate buffer 10, i.e., the sequence consisting of $X_{00}$ to $X_{77}$, is transmitted through first data path 11b and output to 1-D DCT/IDCT processor 12, as is shown in the first and third lines of FIG. 4. When the sequence consisting of $X_{00}$ through $X_{77}$ has been output to 1-D DCT/IDCT processor 12, first data path 11b is closed while second data path 11a is provided for the sequence of $Z_{00}$ through $Z_{77}$. The sequence consisting of $Z_{00}$ through $Z_{77}$ from transpose buffer 13 is transmitted through second path 11a to the 1-D DCT/IDCT processor 12 during the second time period, as shown in the second and third line of FIG. 4.

In the present invention, during the first time period, 1-D DCT/IDCT processor 12 has input data at input port 12a in the order of $X_{0c}$, $X_{1c}$, $X_{2c}$, $X_{3c}$, $X_{4c}$, $X_{5c}$, $X_{6c}$ and $X_{70}$ with c from 0 to 7. The input data is transformed and output to transpose buffer 13. While during the second time period, data sequence of $Z_{R0}$, $Z_{R1}$, $Z_{R2}$, $Z_{R3}$, $Z_{R4}$, $Z_{R5}$, $Z_{R6}$ and $Z_{R7}$ with R from 0 to 7 is input into 1-D DCT/IDCT processor 12 from transpose buffer 13 through second data path 11a to generate output data sequence of $Y_{R0}$, $Y_{R1}$, $Y_{R2}$, $Y_{R3}$, $Y_{R4}$, $Y_{R5}$, $Y_{R6}$ and $Y_{R7}$ with R from 0 to 7.

Figure 5:
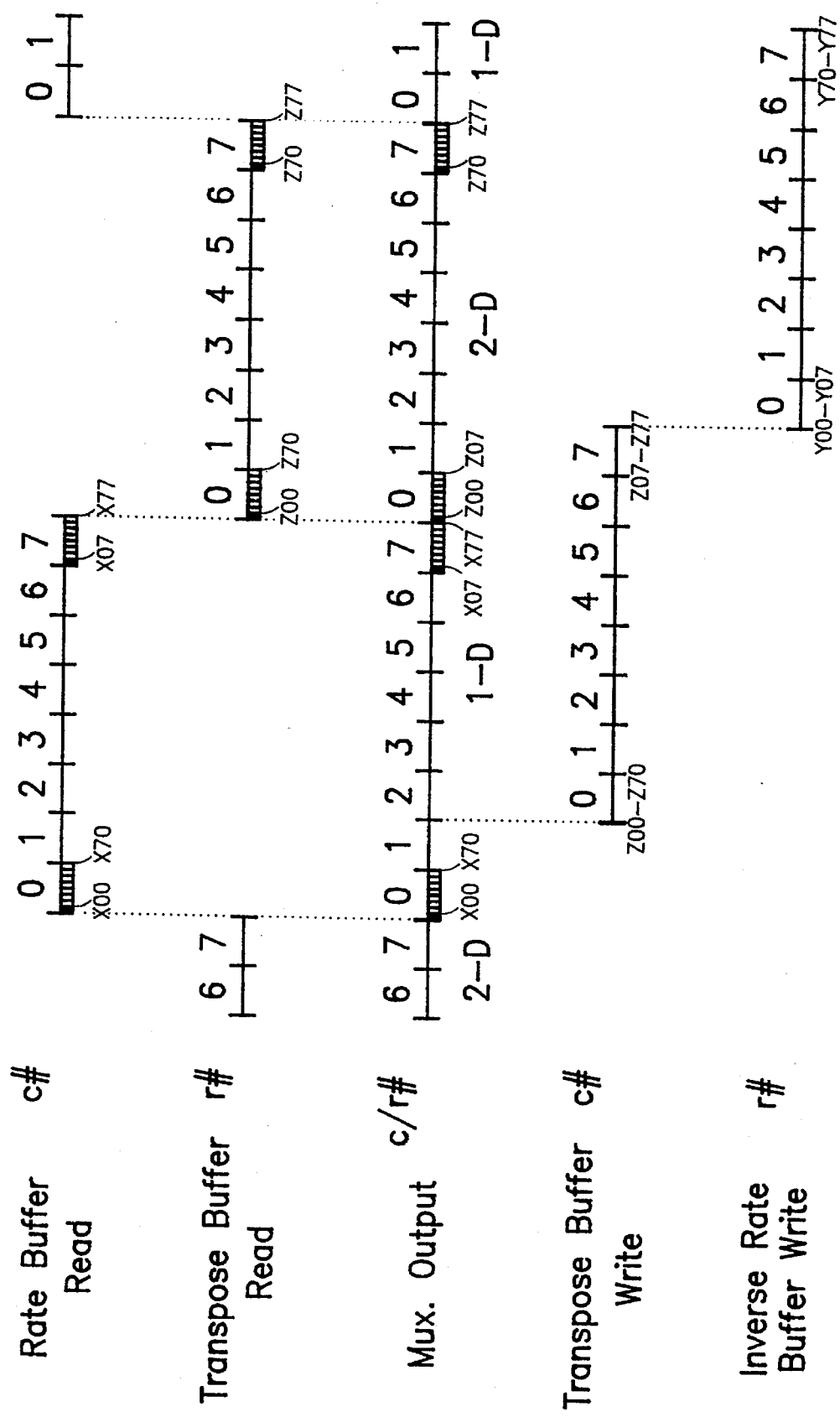
FIG. 5 is a timing diagram of input/output data of all elements of the circuit in FIG. 2.

FIG. 5 is a timing diagram illustrating the relationships among sequences X, Y and Z between the output of rate buffer 10 and input of inverse rate buffer 14. The first line of FIG. 5 shows the timing of data sequence of $X_{00}$ through $X_{77}$ from rate buffer 10. The data sequence is sent to 1-D DCT/IDCT processor 12 through multiplexer 12, as shown in the third line. After an executing time delay, the output data of first dimensional transformation from 1-D DCT/IDCT processor 12 is written into transpose buffer 13 as the sequence of $Z_{00}$ through $Z_{77}$. When the second time period begins, the sequence of $Z_{00}$ through $Z_{77}$ is read out by 1-D DCT/IDCT processor 12 for the second dimensional transformation, as is shown in the second line of FIG. 5. Then the final output sequence of $Y_{00}$ through $Y_{77}$ is acquired by inverse rate buffer 14 from 1-D DCT/IDCT processor 12, as shown in the last line of FIG. 5.

Figure 6:
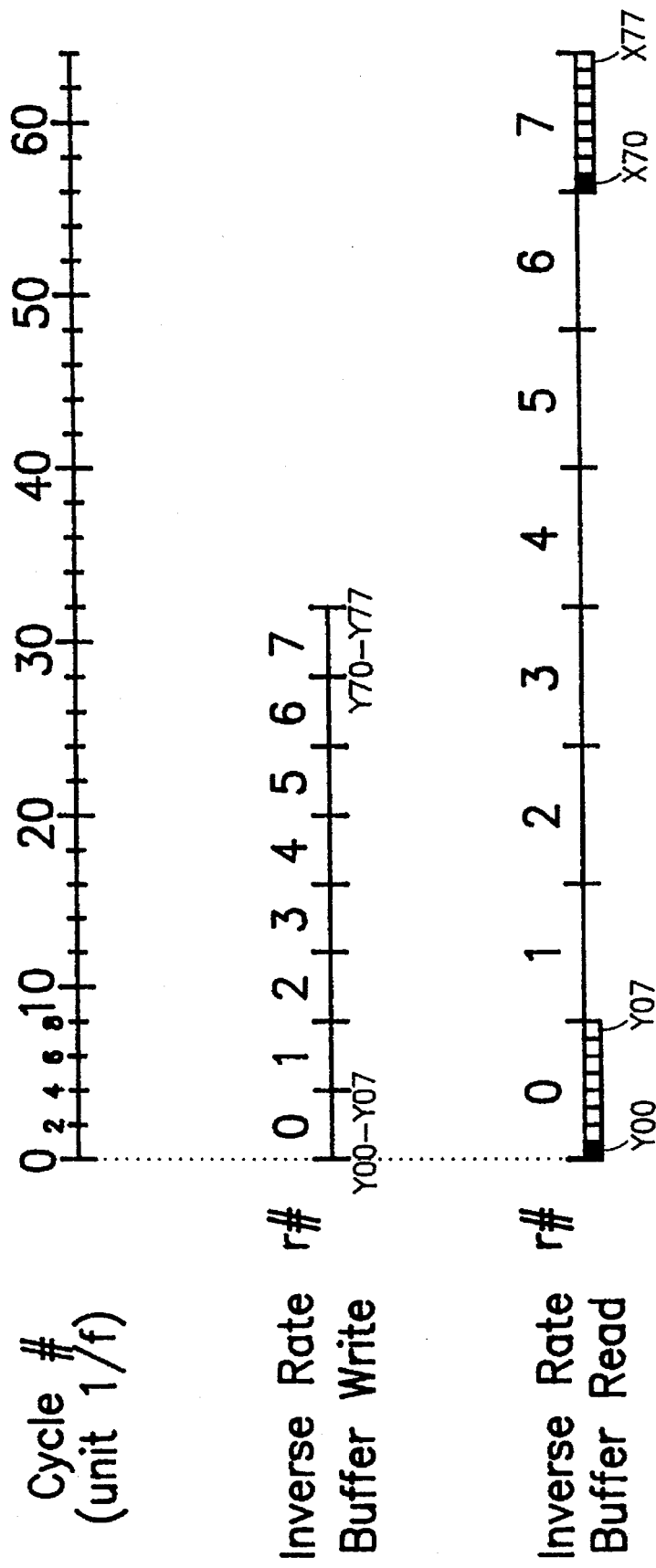
FIG. 6 is a timing diagram of input/output data of the inverse rate buffer in FIG. 2.

The final data sequence of the 2-D DCT/IDCT circuit, i.e., sequence $Y_{00}$ through $Y_{77}$, is output by inverse rate buffer 14 at the first rate. Referring to FIG. 6, in which the top line represents a reference time coordinate, the input data timing and the output data timing of inverse rate buffer 14 are also illustrated. The reference timing coordinate has a unit time scale of 1/f. Obviously, the sequence consisting of $Y_{00}$ through $Y_{77}$ is input into inverse rate buffer 14 at a rate of 2f, which is the second rate. While the data output from inverse rate buffer 14 is at a rate of f, which is the first rate. Since the output rate of inverse rate buffer 14 is the same as the input rate of rate buffer 10, as shown in FIG. 3, the input/output timing of the 2-D DCT/IDCT circuit can be consistent.

Figure 7:
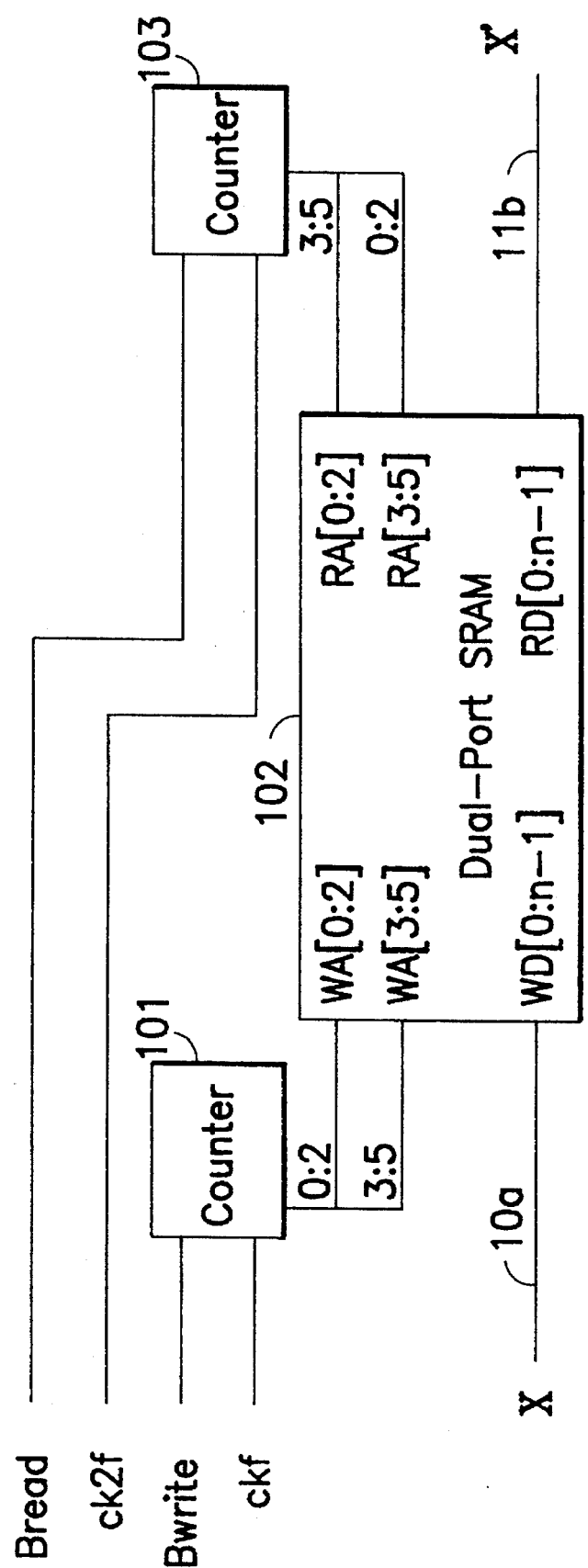
FIG. 7 is a circuit diagram illustrating the rate buffer of FIG. 2.

In order to obtain the various data input/output rates, rate buffer 10 and inverse rate buffer 14 of the present invention can be dual-port devices. For example, a dual-port static random access memory (SRAM), as is shown in FIG. 7, can be utilized as rate buffer 10. Referring to FIG. 7, two counters 101 and 103 are provided and connected to the input port and output port of dual-port SRAM 102 respectively. Counter 101, which is controlled by a write-enabling signal Bwrite through, is driven by a clock signal ckf which has a frequency of f. However, instead of signal ckf, counter 103, which is controlled by a read-enabling signal Bread, is driven by signal ck2f which has a frequency of 2f. Therefore, through the control of address signals WA and RA from counters 101 and 103, dual-port SRAM 102 can read in sequence X at the first rate and output sequence X' at the second rate. Moreover, since the wiring between the counters and the input/output ports of dual-port SRAM 102 can be arranged as desired, there can be several address modes. In other words, the order of the output sequence needs not to be the same as that of the input sequence. Inverse rate buffer 14 can also comprise a dual-port SRAM and two counters, while the signals which drive the input and output counters have an inverse frequency relationship as in the case of rate buffer 10.

Figure 1:
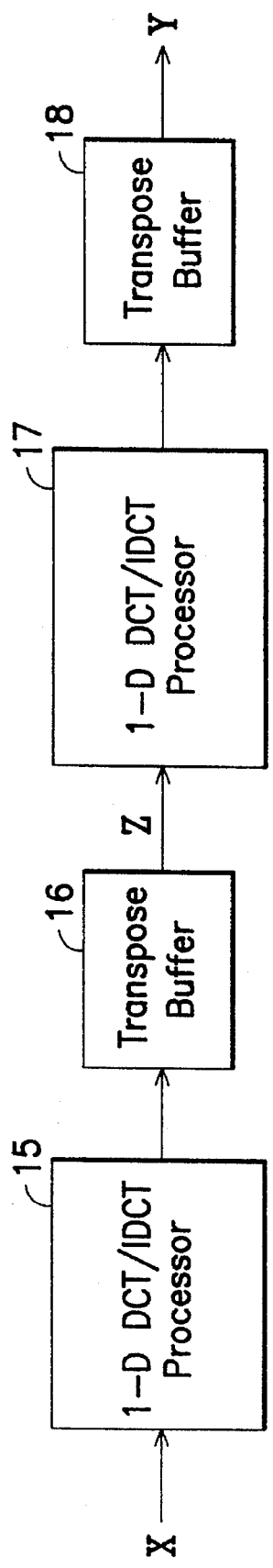
FIG. 1 (Prior Art) is a block diagram of a prior art 2-D DCT/IDCT circuit.

Through the two-speed operation of the 2-D DCT/IDCT circuit, a real time transformation can be achieved. Furthermore, as compared with the conventional circuit of FIG. 1, rate buffer 10 and multiplexer 11 are provided in the present invention to replace the function of 1-D DCT/IDCT processor at the second stage. Since a 1-D DCT/IDCT processor has a circuit dimension approximately 10 times that of a rate buffer plus a multiplexer, the circuit dimension of the present invention can be largely reduced, and the hardware design is much easier. Therefore, the present invention is more suitable for VLSI implementation.

What is claimed is:

1. A real time two-dimensional discrete cosine transform (DCT)/inverse discrete cosine transform (IDCT) circuit comprising:

a rate buffer for inputting an N×N data at a first rate and outputting said data at a second rate;

a multiplexer for providing one of a first data path and a second data path for data transmission, wherein said first data path is provided for said data from said rate buffer during a first time period, while during a second time period, said second data path is provided for transposed data;

a one-dimensional (1-D) DCT/IDCT processor for performing 1-D DCT/IDCT of data from said data paths of said multiplexer;

a transpose buffer for transposing data from said 1-D DCT/IDCT processor, wherein said transposed data is generated by said transpose buffer and is stored therein during said first time period; and an inverse rate buffer for acquiring data from said transpose buffer, during said second time period, at said second rate, and outputting an N×N transformed data at said first rate.

2. The DCT/IDCT circuit of claim 1, wherein said second rate is two times faster than said first rate.

3. The DCT/IDCT circuit of claim 1, wherein said 1-D DCT/IDCT processor is a two-speed DCT/IDCT processor whose throughput rate is not smaller than said second rate.

4. The DCT/IDCT circuit of claim 1, wherein said rate buffer is provided with various address modes for said N×N data.

5. The DCT/IDCT circuit of claim 1, wherein said inverse rate buffer is provided with various address modes for said N×N transformed data.

6. The DCT/IDCT circuit of claim 1, wherein two signals with different frequencies are provided at the input and output ends of said rate buffer.

7. The DCT/IDCT circuit of claim 1, wherein two signals with different frequencies are provided at the input and output ends of said inverse rate buffer.

8. The DCT/IDCT circuit of claim 1, wherein two counters of different operating rates are provided at the input and output ends of said rate buffer.

9. The DCT/IDCT circuit of claim 1, wherein two counters of different operating rates are provided at the input and output ends of said inverse rate buffer.

10. The DCT/IDCT circuit of claim 1, wherein said rate buffer comprises a dual-port device.

11. The DCT/IDCT circuit of claim 1, wherein said inverse rate buffer comprises a dual-port device.

12. The DCT/IDCT circuit of claim 1, wherein said rate buffer comprises a dual-port static random access memory (SRAM).

13. The DCT/IDCT circuit of claim 1, wherein said inverse rate buffer comprises a dual-port SRAM.

14. The DCT/IDCT circuit of claim 1 having a latency less than 2N−1 cycles of the second rate.

* * * * *